United States Patent Office 3,567,783
Patented Mar. 2, 1971

3,567,783
PROCESS FOR PREPARING POLYPHENYL
ETHERS
Gordon P. Brown, Schenectady, N.Y., assignor to
General Electric Company
No Drawing. Filed Aug. 24, 1960, Ser. No. 51,500
Int. Cl. C07c 43/22
U.S. Cl. 260—613                                    2 Claims

ABSTRACT OF THE DISCLOSURE

Polyphenyl ethers which have utility as lubricants, hydraulic fluids and heat transfer agents and process for the preparation of said polyphenyl ethers.

---

This invention relates to high temperature fluid compositions. More particularly, it relates to liquid base stocks for lubricant compositions, hydraulic fluids, heat transfer fluids, etc., which are characterized by stability over a wide range of temperatures, resistance to radiation and having hydrolytic stability.

The use of liquids at relaitvely high temperatures up to the order of about 700° F. are well known, such fluids including among others the silicone or organopolysiloxane materials. However, with the development of modern equipment and machinery operating at temperatures above 700° F., there has correspondingly developed a need for liquid lubricants and other fluids which will remain stable at elevated temperatures up to the order of 850° F. It is further desirable in many cases where the fluid operates in such an environment that it be resistant to breakdown or deterioration by radiation. It is also desirable that it have hydrolytic stability. Ancillary to such basic requirements as stability to heat and to radiation, a wide liquid range and hydrolytic stability are the requirements that the fluid be resistant to oxidation, that it have suitable viscosity temperature characteristics and that it have a desired degree of lubricity where indicated. These ancillary requirements are obtainable by the addition of additives to a base stock which has the three primary properties.

An object of this invention is to provide high temperature fluids which are stable to temperatures of up to the order of about 850° F. and are also resistant to radiation. At the same time, these fluids remain liquid over a range of temperatures from about room temperature up to the order of 850° F. and possess hydrolytic stability.

Briefly, the invention relates to meta-polyphenyl ethers which are characterized by the above qualities, such compounds being prepared through the Ullman ether reaction of aryl bromide with the alkaline salt of a phenol such as the potassium or sodium salt in the presence of catalytic quantities of a metal, such as copper. In general, the reaction temperatures for preparing the present materials range from about 175° C. to 250° C. and the reaction times from one to several hours to produce final products having a formula of the following general type:

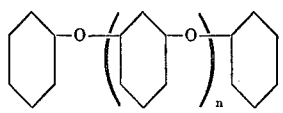

wherein n is a number from 1 to 5 and most preferably from 2 to 5. Generally speaking, the materials are prepared from the reaction of a monohydric phenol and a monobromo or dibromo compound.

In the preparation of the present products where the reaction is of a monohydric phenol and a dibromo compound, the reaction may be expressed as

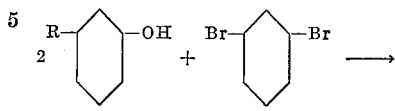

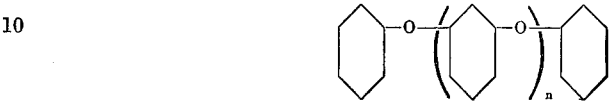

where R is hydrogen, $C_6H_5O$ or $C_6H_5OC_6H_4O$, n being equal, respectively, to 1, 3 and 5. Mixtures of the various R's are also useful. In the preparation of the products from the reaction of a monohydric phenol and a monobromo compound, the reaction may be expressed simply as

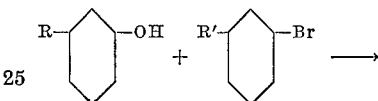

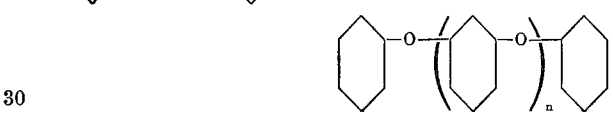

where R and R' are $C_6H_5O$, n is 2. Where R and R' are $C_6H_5OC_6H_4O$, n is 4. Where R is $C_6H_5O$ and R' is $C_6H_5OC_6H_4O$, n is 3, and where R is $C_6H_5OC_6H_4O$ and R' is $C_6H_5OC_6H_4OC_6H_4O$, n is 5. Mixtures of the R's and R"s are also used. It has been found that only the compounds of the invention or those in which n is a number from 1 to 5 and preferably from 2 to 5 exhibit flow points within the order of room temperature and at the same time have a desirably high temperature resistance and boiling point.

Those features of the invention which are believed to be patentable are set forth in the claims appended hereto. The invention will, however, be better understood from a consideration of the following description.

The following examples will illustrate the practice of the invention, it being realized that such examples are not to be taken as limiting in any way, except as set forth in the claims appended hereto.

EXAMPLE 1

[Phenoxy(m-phenoxylene)] benzene was prepared by heating together in a flask fitted with a stirrer, nitrogen inlet, thermometer and steam heated condenser topped by a water-cooled take-off condenser, 169 grams (1.8 moles) of phenol, 58 grams (0.9 mole) of 86% KOH and 3 grams of copper powder. The reactants were blanketed with nitrogen. Upon heating, the reaction mass became fluid at about 40° C. and underwent exothermal heating to about 120° C. The reaction mixture was then heated to 180° C. and 70.8 grams (0.3 mole) of m-dibromobenzene added dropwise. Next, about 45 cc. of xylene was added to maintain reflux at from 180° C. to 185° C. During the dibromobenzene addition, no external heat was required to retain reflux, such reflux being continued for about 10 minutes after all of the dibromobenzene had been added. The product was washed with aqueous NaOH and water and dried over potassium carbonate. A total of 55.2 grams or 70% yield of [phenoxy(m-phenoxylene)] benzene was obtained by distillation and melted at about 136° F. and boiled at 698° F. atmospheric pressure. The formula of this material is

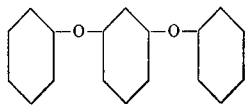

From its rather high melting point and relatively low boiling point, it will be gathered that this material has a relatively narrow useful temperature range.

EXAMPLE 2

[Phenoxytri(m-phenoxylene)] benzene,

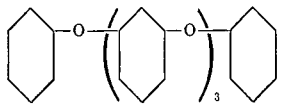

was prepared by charging in a flask fitted as in Example 1, 98 grams (0.525 mole) of 3-hydroxyphenyl phenyl ether, 59 grams meta-dibromobenzene, 5 grams of copper powder and 6 grams of xylene. The reaction mixture was heated to 200° C., and a 50% aqueous KOH solution consisting of 37.5 grams (0.575 mole) of 86% KOH and 26.9 grams of H$_2$O was added dropwise over a period of 42 minutes at 200° C. to 220° C., the reaction mixture then being heated additionally for one hour at 210° C. The reaction mixture was then neutralized, extracted, washed and the solvent removed. The product was then redistilled three times under vacuum to produce a material having a refractive index $n_D^{25}$ of 1.6300 and an average molecular weight of 408 against a theoretical molecular weight of 446 for the pure end product. This material had a flow point of 54° F. and an extrapolated atmospheric boiling point of 1030° F.

The 3-hydroxyphenyl phenyl ether

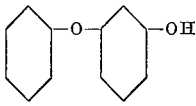

used in the preparation of this example was prepared by charging a flask with 524 grams (5.58 moles) of phenol, 114 grams (2.04 moles) 86% KOH and one gram of copper powder and 150 cc. of diphenyl ether. The temperature was raised to 175° C. and 322 grams (1.86 moles) of m-bromophenol added. The reaction temperature rose to 210° C. and addition of bromophenol was stopped for about 30 minutes. The reaction mixture was then heated for a total of 3 hours between 175° C. and 210° C. Upon separation and distillation, a total weight of 171.6 grams of 3-hydroxyphenyl phenyl ether was obtained.

EXAMPLE 3

[Phenoxypenta(m-phenoxylene)] benzene

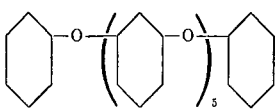

was prepared by charging into a 500 cc., 3-neck reaction flask equipped as in Example 1, 57.5 grams (0.207 mole) of 3-hydroxy-3'-phenoxydiphenyl ether, 21.9 grams (0.093 mole), meta-dibromobenzene, 13.5 grams (0.207 mole) of 86% KOH, 1 gram of copper powder and 5 grams of copper turnings. The reaction began at a temperature of 170° C. and was indicated by the precipitation of potassium bromide. After 1½ hours at 220° to 230° C., the organic phase contained 7.2 ml. equivalents of bromine for a 96% reaction. After three hours' additional time at 240° to 250° C., it showed the same amount of reaction. The product was taken up with benzene and ether, washed with 5% NaOH, with water and then dried with potassium carbonate. The final product after distillation was shown to be 21.9 grams of [phenoxypenta(m-phenoxylene)]benzene. The 3-hydroxy-3'-phenoxy diphenyl ether

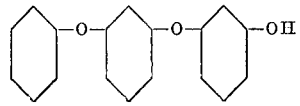

was prepared by charging to a flask with the usual fittings, 2 grams of copper powder, 384 grams (4.08 moles) of phenol and 131 grams (2.04 moles) of 86% KOH. The temperature was raised to 175° C. and 178 grams (0.68 mole) of 3-bromo-3'-hydroxy diphenyl ether added to allow the temperature to rise to 210° C. in 20 minutes. The mixture was heated at a temperature of 208° C. to 210° C. for about 1½ hours. A 68.7% yield or 130 grams of product were obtained after distillation and purification. The product had a flow point of 80° F. and an extrapolated atmospheric boiling point of 1202° F.

The 3-bromo-3'-hydroxy dihenyl ether

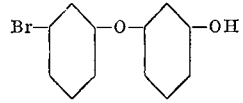

was prepared by reacting 75.7 grams (1.16 moles) 86% KOH, 1000 grams (5.8 moles) meta-bromophenol and 2 grams of copper powder. The reactants heated exothermically and the mixture was then further heated to 210° C. for 2 hours, cooled, purified and distilled to yield 114 grams of product.

EXAMPLE 4

[Phenoxybi(m-phenoxylene)] benzene

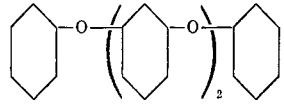

was prepared by charging a flask fitted as above with 150 cc. of diphenyl ether, 68 grams (0.365 mole) of 3-hydroxyphenyl phenyl ether, 23.8 grams (0.365 mole) of 86% KOH and 1 gram of copper powder. The mixture was heated to 175° C. and then while heating was continued to about 225° C., 91 grams (0.365 mole) of 3-bromophenyl phenyl ether or m-bromophenyl phenyl ether was added dropwise over a period of 25 minutes. The reaction mixture was stirred at from about 215° C. to 225° C., cooled and taken up in ether. After washing, purifying, drying and distilling, a 78.5% yield of the product [phenoxybi(m-phenoxylene)] benzene was produced, which had a flow point of 10° F. and a boiling point of 865° F. at atmospheric pressure.

The m-bromophenyl phenyl ether

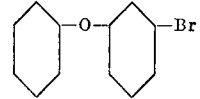

used in this preparation was prepared by reacting together in a flask fitted as above 354 grams (1.54 moles) of meta-dibromobenzene, 47 grams (0.50 mole) of phenol, 36 grams (0.55 mole) 86% KOH, 26 grams of water, 1 gram of copper powder and 5 grams of copper turnings, a reflux temperature of 200° C. being maintained over a time period of about three hours. The reaction product was diluted with benzene, filtered and distilled to obtain a 43% yield of m-bromophenyl phenyl ether.

EXAMPLE 5

[Phenoxytri(m-phenoxylene)] benzene

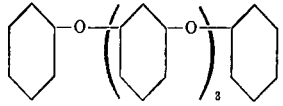

was prepared by charging in a flask fitted as above 64 grams (0.344 mole) of 3-hydroxyphenyl phenyl ether, prepared as in Example 2 above, 2 grams of copper powder and 150 cc. of diphenyl ether, the mixture being heated to 200° C. At this point, 117 grams (0.344 mole) of 3-bromo-3'-phenoxydiphenyl ether

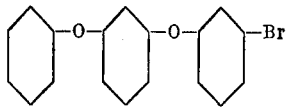

in 100 cc. of diphenyl ether was added dropwise over a period of 1½ hours, the reaction mixture being held at 210° C. to 220° C. for an additional 1¼ hours. The dried, purified and distilled material showed a 58.4% yield of product which had a flow point of 54° F. and an extrapolated atmospheric boiling point of 1030° F.

The 3-bromo - 3' - phenoxydiphenyl ether was prepared by heating 389 grams (1.65 moles) m-dibromobenzene and 2 grams of copper powder to 100° C. at which point a mixture of 102 grams (0.55 mole) m-phenoxyphenol, 39.8 grams (0.61 mole) of 86% KOH and 100 cc. of water were added dropwise over a period of 1¾ hours at an average temperature of 185° C. to 190° C. The reaction mixture was then heated an additional hour at 190° C. to 200° C. The dried and distilled material gave a 105.6 gram yield of the product.

EXAMPLE 6

[Phenoxytetra(m-phenoxylene)] benzene

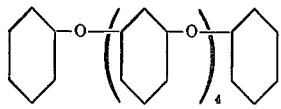

was prepared by mixing together 50.5 grams (0.182 mole) of 3-hydroxy - 3' - phenoxydiphenyl ether, prepared as in Example 4 above, 11.9 grams (0.182 mole) 86% KOH, 1 gram of copper powder and 150 cc. of diphenyl ether. The reaction mixture was heated to 175° C. over a period of 14 minutes and 62 grams (0.182 mole) of 3-bromo-3'-phenoxydiphenyl ether prepared as in Example 5 above was added dropwise over a period of 12 minutes during which time the temperature rose to about 220° C. Heating was continued for 13 minutes at the same temperature. The reaction mixture was then stirred for one hour at 220° to 230° C., cooled, dried, separated and distilled to yield 51 grams (0.059 mole) of product which had a flow point of 67° F. and an extrapolated atmospheric boiling point of 1112° F.

EXAMPLE 7

[Phenoxypenta(m-phenoxylene)] benzene

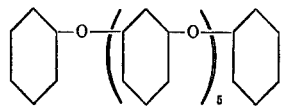

was prepared in a flask equipped as above with 1 gram of copper powder, 10.4 grams (0.16 mole) 86% KOH, 41.4 grams (0.15 mole) of 3-hydroxy - 3' - phenoxydiphenyl ether, prepared as in Example 3 above, and about 250 cc. of diphenyl ether. The temperature was raised to 175° C. and dropwise addition made over a period of 15 minutes at 200° C. to 225° C. of 65 grams (0.15 mole) of 3-(m-bromophenoxylene)-3'-phenoxydiphenyl ether. The reaction mixture was then heated to 210° to 225° C. for two hours, the product extracted, dried and distilled to give a yield of 21 grams of product with a flow point of 80° F. and an extrapolated atmospheric boiling point of 1202° F.

The 3-(m-bromophenoxylene) - 3' - phenoxydiphenyl ether

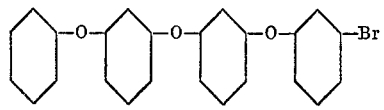

was prepared by reacting 283 grams (1.2 moles) of m-dibromobenzene, 1 gram of copper and a suspension of 0.3 mole of the potassium salt of 3-hydroxy-3'-phenoxydiphenyl ether in 75 cc. of water. The reaction mixture was heated to 206° C. over a period of 45 minutes during which time the water was distilled off and further maintained at 206° C. to 220° C. for an additional 1¼ hours. An additional 100 grams of meta-dibromobenzene was added to replace that lost by steam distillation. The reaction mixture was chilled, acidified, and about 200 mm. of ether added. The layers were then separated and the aqueous layer extracted with ether and the combined ether extracts washed with water and dried. The ether solution was then concentrated on a steam bath and the residue distilled at reduced pressure to produce a total of 80 grams (61.5% yield) of product.

EXAMPLE 8

Meta-poly(phenyl) ethers

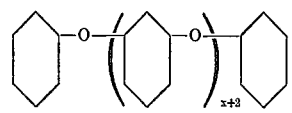

where $x+2$ is a number which is two more than the number of phenoxy groups in the dibromo ethers, were prepared by charging to a flask equipped as above, 74.2 grams (0.2 mole) of mixed dibromo ethers of the formula

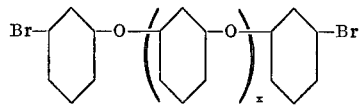

where $x$ is 1, 79 grams (0.84 mole) phenol, 41 grams (0.63 mole) 86% KOH and 4.9 grams of copper turnings which were held at 225 to 240° C. for 3 hours. The product was washed with NaOH, with water and then distilled to produce 39.9 grams of mixed ethers with a flow point of 54° F. and an extrapolated atmospheric boiling point of 1030° F.

The dibromo ethers or 3,3' - dibromo-m-polyphenyl ethers were prepared by charging to a flask equipped as above, 199.5 grams (1.155 moles) m-bromophenol, 136.5 grams (0.578 mole) dibromobenzene, 100 grams diphenyl ether, 5.6 grams copper turnings and 165.2 grams (1.27 moles) 43% KOH, the latter being added uniformly over a period of 1 hour to the remainder of the ingredients at 180°. The mixture was held at 180° C. for 15 minutes more to yield 171.2 grams of product. This method of preparation was varied by adding to the rest of the ingredients the m-bromophenol and the KOH.

In lieu of phenol, of course, monohydric phenols of the formula

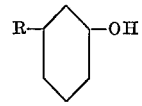

can be used. Then when R is H, $n$ is 0, 1, 2 or 3 or mixtures thereof, and where R is $C_6H_5O$—, $x$ is 0 or 1 or mixtures thereof.

It will be noted, of course, from the above that Examples 2 and 5 each refers to the preparation of [phenoxytri(m-phenoxylene)] benzene. As a matter of convenience, the preparation described in Example 2 is preferred. Likewise, Examples 3 and 7 refer to the preparation of [phenoxypenta(m-phenoxylene)] benzene, and of these two examples, the preparation set forth in Example 3 is preferred.

From the above it will be seen that the present materials, especially those in which $n$ is equal to from 2 to 5, remain liquid from room temperature to over 850° F. The materials where $n$ or $x+2$ is from 2 to 5 have decomposition rates of only 0.014 mm. Hg/sec. pressure rise at about 830° F. These materials, besides having favorable flow characteristics, have been found to be particularly resistant to nuclear radiation. They are also characterized by hydrolytic stability. The materials of the present invention have been found to be useful in lubricating applications where the above characteristics of a wide range of fluidity points, resistance to radiation and hydrolytic stability are required. They are also useful as hydraulic fluids and heat transfer fluid.

What I claim as new and desire to secure by Letters Patent of the United States is:

1. A method of forming a compound of the formula

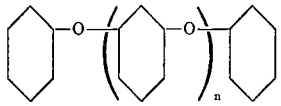

which comprises reacting a monohydric phenol of the formula

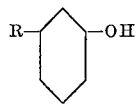

and a dibromo compound of the formula

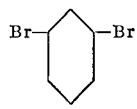

where R is selected from the group consisting of H, $C_6H_5O$ and $C_6H_5OC_6H_4O$, and mixtures thereof, $n$ being, respectively, 1, 3 and 5 and from 1 to 5.

2. The method of preparing compounds of the formula

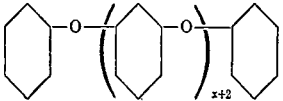

which comprises reacting a monohydric phenol of the formula

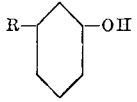

and a dibromo compound of the formula

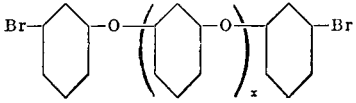

where R is selected from the group consisting of H and $C_6H_5O$— and mixtures thereof, $x$ is from 0 through 3 when R is H and 0 to 1 when R is $C_6H_5O$—, and 0 through 3, when R is mixtures of H and $C_6H_5O$—.

References Cited

UNITED STATES PATENTS

| | | | |
|---|---|---|---|
| 3,083,234 | 3/1963 | Sax | 260—613 |
| 3,034,700 | 5/1962 | Hickman | 260—613 |
| 1,238,643 | 7/1960 | Blake et al. | 260—613 |
| 2,940,929 | 6/1960 | Diamond | 260—613 |
| 3,451,061 | 6/1969 | Blake et al. | 260—613 |

FOREIGN PATENTS

| | | | |
|---|---|---|---|
| 1,242,463 | 8/1960 | France | 260—613 |

OTHER REFERENCES

Blake et al., High Temperature Base Stock Fluids, WADC Technical Report, 57–437, ASTIA Document No. AD142, 188, December 1957, p. 11.

Derwent Belgian Patent Report, vol. 66A (July 15, 1960), p. C(10), 260–613.

Chemical and Engineering News, vol. 37, No. 15, Apr. 15, 1959 (pp. 64–65).

Kotera, Chemical Abstracts, vol. 45 (1951), pp. 6598, 260–613.

BERNARD HELFIN, Primary Examiner

U.S. Cl. X.R.

252—73, 52, 67